United States Patent [19]

Hines

[11] Patent Number: 4,584,624

[45] Date of Patent: Apr. 22, 1986

[54] STATION PROTECTOR FOR TELECOMMUNICATIONS SYSTEMS

[75] Inventor: William W. Hines, Arlington Heights, Ill.

[73] Assignee: Northern Telecom Limited, Montreal, Canada

[21] Appl. No.: 679,634

[22] Filed: Dec. 10, 1984

[51] Int. Cl.[4] .............. H02H 3/22

[52] U.S. Cl. .............. 361/119; 361/124

[58] Field of Search .............. 361/117, 119, 124; 337/17, 18, 20, 32, 33, 34

[56] References Cited

U.S. PATENT DOCUMENTS

| | | | |
|---|---|---|---|
| 4,128,855 | 12/1978 | Gilberts | 361/119 |
| 4,405,967 | 9/1983 | Cwirzen | 361/124 |
| 4,533,971 | 8/1985 | Smith | 361/124 |

*Primary Examiner*—Harry E. Moose, Jr.

*Attorney, Agent, or Firm*—Schwartz, Jeffery, Schwaab, Mack, Blumenthal & Evans

[57] ABSTRACT

A station protector, particularly for telephone lines, has a housing with wells in which are positioned protector module assemblies, one for each line. Each line is connected to a basket member positioned in the bottom of a well and having cantilever legs extending upwards. A protector module assemlby is insertable in the top of each well and a bottom electrode of the protector module pushes down the basket member against a spring bias. If no protector module assembly, or if only a housing of such an assembly without a protector module, is inserted in a well, the basket member moves up and the legs move into contact with a metal collar at the top of the well, the collars connected to a ground terminal. The protector module assemblies connect to the metal collars, as by being screwed into position.

14 Claims, 7 Drawing Figures

STATION PROTECTOR FOR TELECOMMUNICATIONS SYSTEMS

This invention relates to station protectors, as used in telecommunications systems for example. Such protectors are used to protect equipment against overvoltage and overcurrent conditions. In particular the protectors in accordance with the present invention are positioned at customers premises to protect telephones and other equipment against the affects of such overload conditions. A particular feature of the invention is the ensuring of a conductor line being connected to ground in the event that an arrestor module is removed from the protector, or only the casing or housing of an arrestor module is inserted into the protector with the interior items of the arrestor module, such as the carbon electrodes or gas tube, being omitted.

The arrestor module acts to break down at a desired overvoltage condition, by discharge across a gap between a pair of electrodes, the electrodes being connected respectively to one of the line conductors and to ground. An arrestor module is normally provided for each line conductor, that is for Tip and Ring. A fusible element is usually provided in series with the gap. The fusible element melts on occurrence of an overcurrent condition, or on a continuous, or long term, overvoltage condition. When a gas tube arrestor is used a back-up gap or other secondary protector device may also be provided.

With conventional devices, as just described, if the arrestor module assembly is removed completely, then there is no protection provided for the equipment. Such a condition is readily noticeable however as the absence of the arrestor module assembly is seen. It is possible to remove the arrestor module and other items from within the housing or casing and re-position the housing or casing in the protector. The equipment then appears to be protected but is not, as there is no provision for overload breakdown and the line conductor is not grounded.

The present invention provides a protector having an insulating base in which is at least one well. An arrestor module is normally positioned in each well. Positioned in the bottom of each well is a metal basket having flexible fingers extending up from a base. A compression spring is positioned between the basket base and the bottom of the well. The fingers, at a position intermediate their length, are in sliding contact with an annular metal insert in the wall of the well, the insert connected to a line conductor terminal. At the top of the well is an internally threaded metal collar connected to a ground terminal. An arrestor module assembly screws into the metal collar and the bottom electrode of the arrestor module makes contact with and pushes down the metal basket, against the spring. When the arrestor module is removed, or only a casing or housing without an arrestor module is screwed into the metal collar, the spring pushes the metal basket upward and the ends of the fingers make contact with the metal collar. This connects the line conductor terminal to the ground terminal.

The invention will be readily understood by the following description in conjunction with the accompanying drawings, in which.

Figure 1:
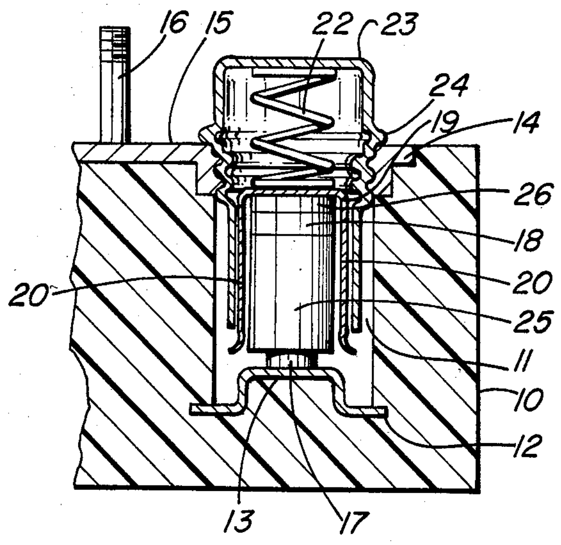
FIG. 1 PRIOR ART
FIG. 1 is a cross-section through a protector module and one arrestor module assembly.

FIG. 1 illustrates a conventional form of station protector. Normally a protector has two arrestor modules, one for each line, but in FIG. 1 only part of the protector is shown, with one arrestor. The protector has a base 10, of molded synthetic resin with two wells extending down from a top surface, one well indicated at 11. At the bottom of the well is a line contact member 12 having a raised central portion 13. At the top of the well is a metal ring 14 having an internal thread, the ring connected to a ground member 15 connected to a ground terminal 16. The line contact meaber 12 is connected to a line terminal, not shown.

An arrestor module assembly comprises an arrestor module having two spaced electrodes 17 and 18 positioned within a basket 19 having flexible legs 20 extending downwardly from a base 21. A compression spring 22 extends between the base 21 and the top end 23 of a metal housing or case 24 which screws into the metal ring 14. The housing 24 extends down over a major part of the length of the fingers 20 of the basket. When the housing is screwed into the ring 14, the arrestor module and the basket 19 are pushed down by the spring and the bottom electrode 17 makes contact with the central portion 13 of the line contact member 12.

In the example illustrated, the arrestor module is of gas tube form, the electrodes 17 and 18 extending into a ceramic tube 25 and bonded thereto, the two electrodes defining a gap within the ceramic tube. Between the top electrode 18 and the base 21 of the basket 19 is a disc 26 of fusible metal.

In operation, on the occurrence of an excess voltage, above a predetermined value, arcing occurs across the gap between the electrodes 17 and 18. The overvoltage is thus discharged to ground via the disc 26, basket base 21, the spring 22 and also the casing 23, and the ground member 15 and ground terminal 16. On occurrence of a current overload, or a long term voltage overload, the fusible metal disc 26 melts and the spring pushes down the basket 19. The lower ends 27 of the legs 20 make contact with the central portion 13 of the line contact member 12. This connects the line contact meaber permanently to ground. It is normally necessary to replace the arrestor module, basket, spring and fusible disc to bring the line conductor back into service.

As previously stated, two arrestor modules are normally provided, one for each line conductor, Tip and Ring. The two arrestor modules are normally in a single protector.

Figure 3:
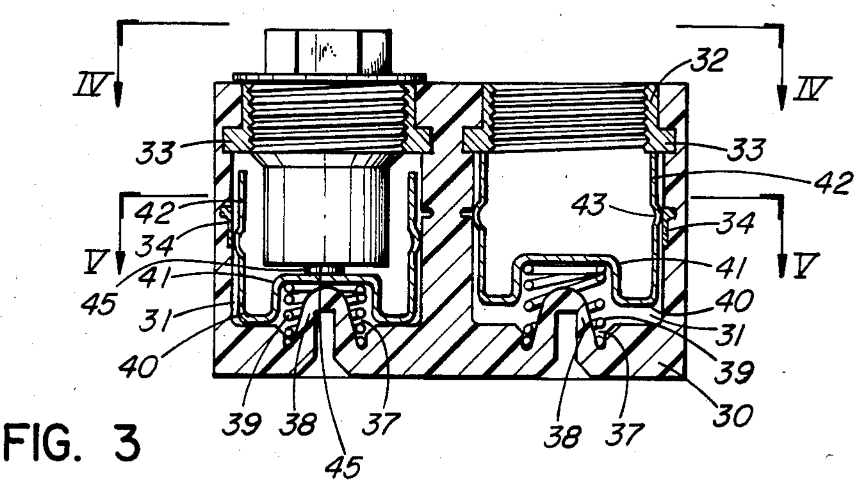
FIG. 3 is a diagrammatic cross-section, on the line III—III of FIG. 4, through one form of protector module incorporating the present invention.
Figure 5:
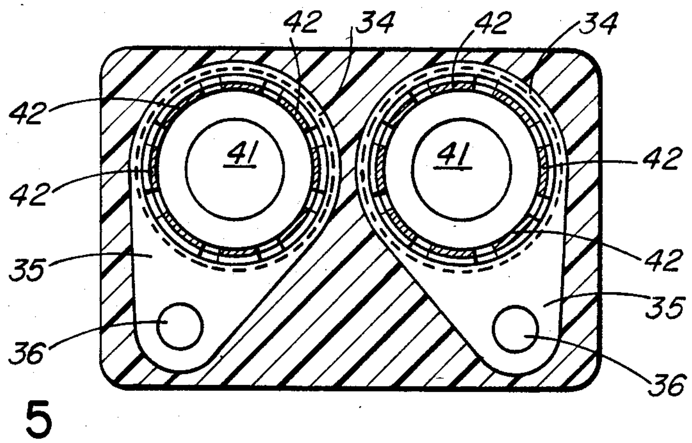
FIG. 5 is a cross-section on the line V—V of FIG. 3.

Considering now the present invention, FIG. 3 illustrates, in cross-section, a station protector 30 having two wells 31. At the top of each well is a metal ring or collar 32, internally threaded, and having a radially extending flange 33 at its lower end. Positioned in the wall of each well, at approximately a mid-position, is an annular contact member 34. Annular contact member 34 is part of a line contact member 35—seen in FIG. 5. A line conductor terminal 36 is connected to the line contact member 35.

Figure 4:
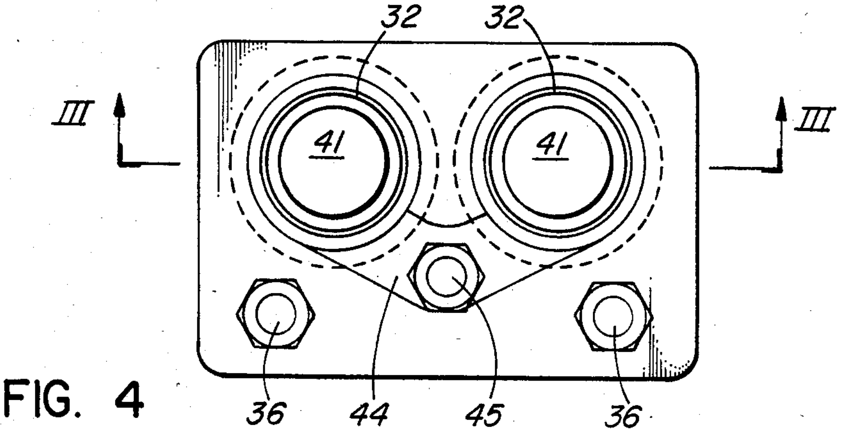
FIG. 4 is a top plan view of the protector module of FIG. 3, with arrestor module assemblies removed, on the line IV—IV of FIG. 3.
Figure 6:
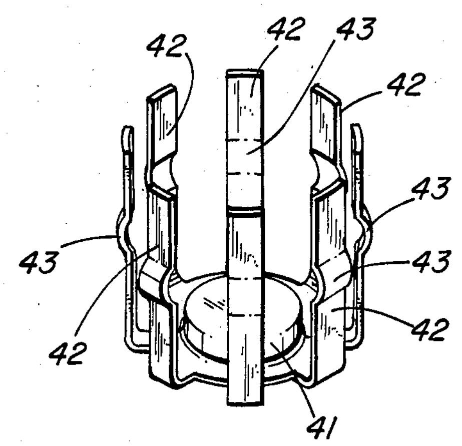
FIG. 6 is a perspective view of the metal basket used in association with each arrestor module in the protector module of FIGS. 3, 4 and 5.

At the bottom of each well there is formed an annular groove 37 and a central boss 38. Resting in the groove 37 and extending up around the boss 38 is a compression spring 39. Positioned in each well is a metal basket member 40. The base 41 of the basket member is formed upward to provide a recess which extends over the boss 38 and also receives the upper part of the spring 39. The basket has a plurality of cantilever fingers 42 extending up from the base, as seen in FIG. 6. The fingers are each given an outwardly projecting arcuate formation 43 which makes sliding contact with the annular contact member 34. The metal rings or collars 32 at the top of each well are connected to a common ground member 44, seen in FIG. 4, to which is connected a ground terminal 45.

Figure 2:
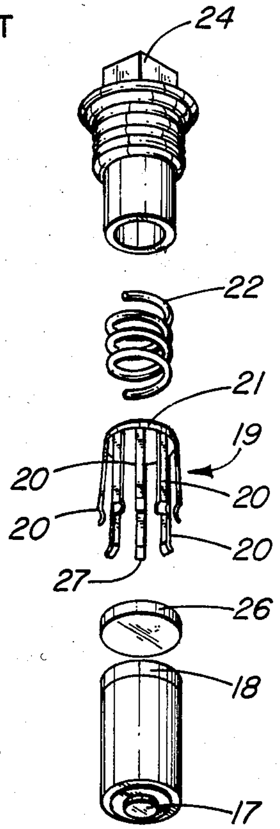
FIG. 2 PRIOR ART
FIG. 2 is an exploded perspective view of the arrestor module assembly as provided in FIG. 1.

In the left hand well in FIG. 3 an arrestor module assembly is screwed in, into the threaded ring or collar 32. The arrestor module assembly, for convenience is the same as in FIGS. 1 and 2, with the same reference numerals used. The bottom electrode 17 of the arrestor module is in contact with the raised center part of the basket base 41 and as the arrestor module assembly is screwed in, the basket is pushed down against the spring 39. In this condition the line conductor connected to a line terminal 36 is connected to the bottom electrode 17 via the contact member 35, annular contact member 34 and the basket 40.

If a voltage overload occurs, arcing occurs across the gap in the arrestor module, as in the arrangement of FIG. 1, thus connecting the overvoltage to ground. If a current overload occurs, or a long term voltage overload, the fusible disc 26 in the arrestor module melts and the basket 19 inside the arrestor module housing 24 is pushed down. The lower ends of the legs 20 of the basket 19 make contact with the raised center part of the base 41 of the basket member 40. The line conductor is then permanently connected to ground until the arrestor module asseably is provided with a new arrestor module, fusible disc and other parts.

It will be appreciated that, in the protector arrangement as illustrated in FIG. 1, removal of the arrestor module asseably leaves the line conductor without protection. This can be dangerous if an overvoltage or overcurrent condition occurs on the line conductor. In the arrangement illustrated in FIG. 3, on removal of an arrestor module assembly, the outer basket member 40 moves up under the action of the spring 39 and the upper ends of the fingers 42 move into contact with the flange 33 of the ring or collar 32. This connects the line conductor to ground via the line contact member 35, annular contact member 34, fingers 42 and ring or collar 32 and ground member 44. This is illustrated on the right hand side of FIG. 3.

In the arrangement of FIG. 3, if an attempt to return the line conductor to use by screwing in just the housing 24 of an arrestor module assembly, disconnection of the line conductor from ground will not occur. If just the housing is screwed in then either the housing will contact the raised central portion of the base 41 of the basket member 10, or, it will pass down over the raised portion. In either condition, the line conductor will still be connected to ground. If a housing 24 with a spring 22 and basket 19 is screwed in, then the lower ends of the legs 20 of the basket 19 will contact the raised central portion of the base 41, and thus still connect the line conductor to ground, even though the outer basket member 40 is pushed down against the spring 39.

Figure 7:
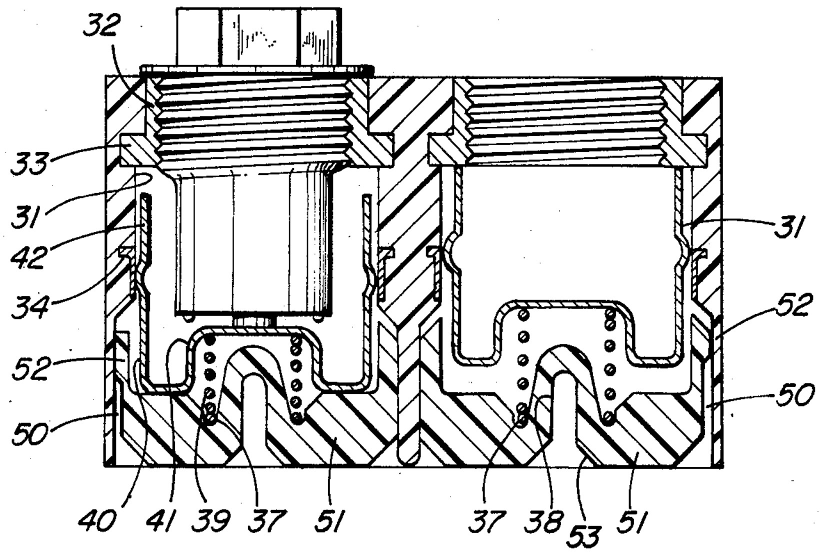
FIG. 7 is a cross-section similar to that of FIG. 3 illustrating one form of manufacture.

FIG. 3 illustrates diagrammatically a protector module, without consideration of manufacture and assembly. To ease molding and machining of the module, and asseably, it is more convenient to form the wells by having separate inserts at the bottom. This is illustrated in FIG. 7. The wells 31 extend right through the base 10, the wells each having an enlarged portion 50 at the lower end. Into the enlarged portion 50 are fitted circular plugs 51, the plugs each having a short portion 52 which is a close fit in the enlarged bore portion 50. Each plug also has the annular groove 37 and central boss 38. This enables the metal basket 40 to be inserted through the bottom of the base 10 and then the spring 39 and the plug.

The plugs 51 can be retained in position by a variety of ways. For example, the portions 52 can be a tight fit in the enlarged bore portions 50. A small annular groove can be formed by chamfering the bottom edges of the plugs, as indicated at 53, and this groove can be filled with a potting compound or a bonding material. Spring fingers engaging in apertures in the walls of the wells can be provided. Some welding can also be used.

Thus the invention ensures that, unless an arrestor module assembly with an arrestor module in good condition is screwed into the protector, the line conductor will not be disconnected from ground. In certain circumstances, it may be that a protector may only protect a single line. It is feasible, and within the scope of the invention that only a single arrestor module may be provided in a protector.

I claim:

1. A station protector comprising an insulating base; at least one well extending in said base, said well apex at a top end; a metal basket member in said well, said basket including a base and a plurality of cantilever fingers extending up from the basket base; an annular metal insert in a peripheral wall of said well and means for connecting a line conductor to said annular insert, said fingers in sliding contact with the insert; a metal collar at the top end of said well and means for connecting a ground conductor to said collar; a compression spring positioned between said base of said basket member and the bottom of said well, said spring biasing said basket member to push upper ends of said cantilever fingers into contact with said metal collar; the arrangement such that on inserting an arrestor module assembly into said metal collar, an electrode of the arrestor module contacts said base of said basket member and pushes the basket member down against said spring whereby said cantilever fingers are moved out of contact with said collar.

2. A protector as claimed in claim 1, including two wells extending in said base, means for connecting one conductor line of a pair to one annular metal insert in one well and means for connecting the other conductor line of a pair to the annular metal insert in the other well, and means for connecting the metal collars at the top ends of both wells to a common ground conductor.

3. A protector as claimed in claim 1, said metal collar having an internal thread.

4. A protector as claimed in claim 1, said well comprising a bore extending through said insulating base, and a plug inserted into the bottom of said bore, the inner surface of said plug forming the bottom of the well.

5. A protector as claimed in claim 1, said bottom of said well comprising an annular recess extending around a central boss, said compression spring being seated in said annular recess.

6. A protector as claimed in claim 1, said cantilever fingers of said basket member each having an outwardly projecting arcuate formation for making said sliding contact with said annular metal insert.

7. A protector as claimed in claim 1, said basket member base having a raised central portion, said compression spring being seated at its upper end in said raised central portion, and said electrode of said arrestor module making contact with and pushing on said raised central portion.

8. A station protector comprising an insulating base; two parallel wells extending into said base, each well being open at a top end; a metal collar at the top end of each well, the metal collars connected to a common ground terminal; a metal basket member positioned in each well, each basket member having a base and a plurality of cantilever spring fingers extending up from the basket base, the upper ends of said fingers substantially coaxial with the related metal collar and adapted to contact the metal collar in an upward position; an annular metal insert in the wall of each of said wells, the spring fingers of the basket members making sliding contact with said metal inserts; a compression spring between said base of each basket meaber and the bottom of each well, said springs biasing said basket members towards an upward position with said cantilever fingers in contact with said collars; an arrestor module assembly positioned in each of said wells, connected to said collars, each arrestor module asseably comprising a metal tubular housing open at a bottom end; an arrestor module having two electrodes, a top electrode and a bottom electrode, spaced to define a spark gap; a metal basket positioned within the housing and having downwardly extending flexible legs, the arrestor module positioned within the basket; a compression spring positioned between the basket and the top end of the housing; and a fusible pellet between the top electrode and the top of the basket; the bottom electrode in contact with the related base of a basket member, and pushing the basket member down against the compression spring between the base of the basket member and the bottom of the well to maintain said fingers of said basket member out of contact with said metal collar; the arrangement such that on removal of an arrestor module, said basket member is moved to said upward position with the fingers of said basket member in contact with said collar.

9. A protector as claimed in claim 8, said metal collars having an internal thread and said metal tubular housings screwing into said metal collars.

10. A protector as claimed in claim 8, each well comprising a bore extending through said insulating base, and a plug inserted into the bottom of each bore, the inner surface of the plugs defining the bottoms of the wells.

11. A protector as claimed in claim 8, said cantilever fingers each having an outwardly projecting arcuate formation in contact with said annular metal inserts.

12. A protector as claimed in claim 8, each said basket member base having a raised center portion, said bottom electrodes in contact with said raised center portions.

13. A protector as claimed in claim 12, the bottom of each well comprising an annular recess around a central boss, said compression springs positioned between said base of each basket member and the bottom of each well being seated at the lower ends in said annular recesses and at the upper ends in said raised center portions.

14. A protector as claimed in claim 12, the flexible legs of each basket of each arrestor module adapted to contact the raised center portion of the base of a basket member on fusing of said fusible pellet.

* * * * *